US011006014B2

(12) United States Patent
Hashimoto

(10) Patent No.: US 11,006,014 B2
(45) Date of Patent: May 11, 2021

(54) INFORMATION PROCESSING APPARATUS AND METHOD OF CONTROLLING INFORMATION PROCESSING APPARATUS

(71) Applicant: CANON KABUSHIKI KAISHA, Tokyo (JP)

(72) Inventor: Minoru Hashimoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/580,577

(22) Filed: Sep. 24, 2019

(65) Prior Publication Data

US 2020/0106909 A1    Apr. 2, 2020

(30) Foreign Application Priority Data

Sep. 28, 2018 (JP) .............................. JP2018-185427

(51) Int. Cl.
*H04N 1/00* (2006.01)
*G06F 1/3234* (2019.01)
*G06F 1/3206* (2019.01)
*G06F 1/3296* (2019.01)

(52) U.S. Cl.
CPC ....... *H04N 1/00888* (2013.01); *G06F 1/3206* (2013.01); *G06F 1/3265* (2013.01); *G06F 1/3296* (2013.01); *H04N 1/001* (2013.01); *H04N 1/00904* (2013.01); *H04N 2201/0094* (2013.01)

(58) Field of Classification Search
None
See application file for complete search history.

(56) References Cited

U.S. PATENT DOCUMENTS

| 2008/0215726 | A1* | 9/2008 | Sullivan | H04L 67/125 709/224 |
| 2010/0091523 | A1* | 4/2010 | Uno | H02M 1/4225 363/20 |
| 2017/0163830 | A1* | 6/2017 | Goda | H04N 1/00904 |
| 2017/0289378 | A1* | 10/2017 | Tsukui | G06K 15/406 |
| 2018/0095516 | A1* | 4/2018 | Kozuka | H02M 1/4208 |
| 2018/0131269 | A1 | 5/2018 | Okuzono | |

FOREIGN PATENT DOCUMENTS

JP    2007-90830 A    4/2007

* cited by examiner

*Primary Examiner* — Frantz Bataille
(74) *Attorney, Agent, or Firm* — Canon U.S.A., Inc. IP Division

(57) ABSTRACT

An information processing apparatus includes an output unit configured to output a direct current after converting an alternating current into the direct current and a power factor correction circuit configured to correct a power factor of the output unit, and is shifted from a first power state to a second power state. The information processing apparatus includes a detection unit configured to detect predetermined return request in the second power state, and a power control unit configured to shift, based on detection by the detection unit, the information processing apparatus from the second power state to a third power state in which processing corresponding to the predetermined return request is performable. The power control unit shifts the power state of the information processing apparatus from the third power state to the second power state after the processing is completed in the third power state.

17 Claims, 8 Drawing Sheets

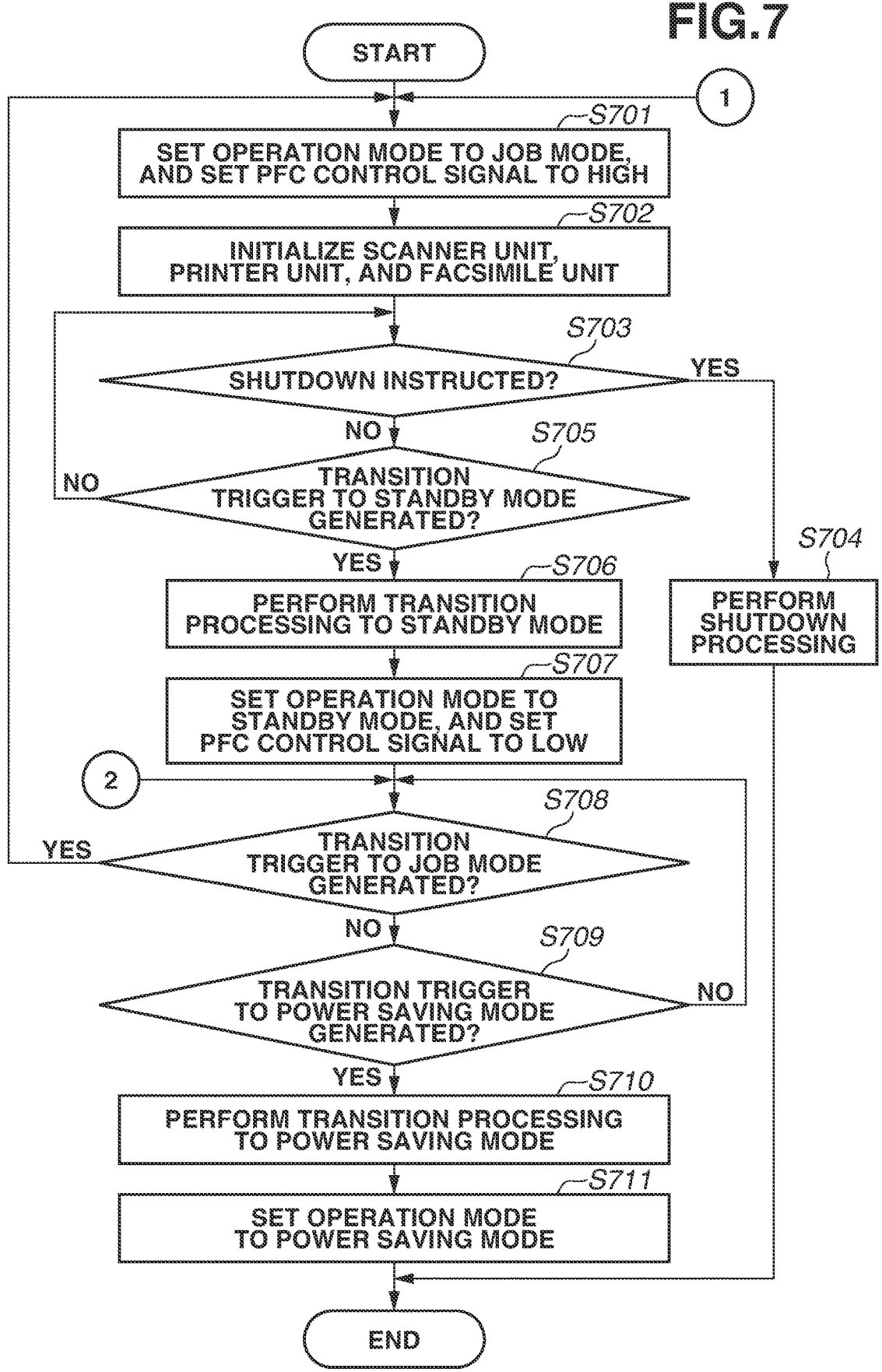

INFORMATION PROCESSING APPARATUS AND METHOD OF CONTROLLING INFORMATION PROCESSING APPARATUS

BACKGROUND

Field

The present disclosure relates to an information processing apparatus and a method of controlling the information processing apparatus.

Description of the Related Art

Like multifunctional peripherals including functions of copy, print, scan, and facsimile, information processing apparatuses that are operated by power supplied from a commercial power supply can include a power supply unit that converts an alternating-current voltage supplied from the commercial power supply into a direct-current voltage. Such a power supply unit can include a smoothing capacitor that rectifies an input alternating-current voltage and smoothes the rectified voltage. A current flows at timing when a voltage value of the input alternating-current voltage becomes higher than a voltage value of the smoothing capacitor. Therefore, a power factor correction (PFC) circuit is used to reduce phase deviation between the input voltage and the input current, to prevent a large current from flowing through the apparatus in a short time.

In various embodiments, such an information processing apparatus can be operate in a plurality of power modes, for example, a normal mode in which power is supplied to a printer unit, a display unit, and a control unit, and a power saving mode in which power is supplied to only a part of the information processing apparatus. In the power saving mode, an amount of a current flowing through the apparatus is small. The PFC circuit may therefore not be utilized since a large current does not flow through the apparatus in a short time. In an information processing apparatus discussed in Japanese Patent Application Laid-Open No. 2007-90830, whether to perform control by the PFC circuit is changed so that the control by the PFC circuit is not performed while the information processing apparatus is operated in the power saving mode.

SUMMARY

According to various embodiments of the present disclosure, an information processing apparatus includes an output unit configured to output a direct current after converting an alternating current into the direct current and a power factor correction circuit configured to correct a power factor of the output unit, wherein the information processing apparatus shifts from a first power state in which the power factor correction circuit corrects the power factor of the output unit to a second power state in which the power factor correction circuit does not correct the power factor of the output unit. Power consumption in the second power state is lower than power consumption in the first power state. The information processing apparatus includes a detection unit configured to detect a predetermined return request in the second power state, and a power control unit configured to shift, based on the detection unit detecting the predetermined return request, the information processing apparatus from the second power state to a third power state in which the power factor correction circuit does not correct the power factor of the output unit and processing corresponding to the predetermined return request is performable, wherein the power control unit shifts the power state of the information processing apparatus from the third power state to the second power state after the processing corresponding to the predetermined return request detected by the detection unit is completed in the third power state.

Further features will become apparent from the following description of exemplary embodiments with reference to the attached drawings.

BRIEF DESCRIPTION OF THE DRAWINGS

FIG. 7 is a flowchart illustrating processing relating to transition of the power mode of the multifunctional peripheral according to the present exemplary embodiment.

DESCRIPTION OF THE EMBODIMENTS

An exemplary embodiment of the present disclosure is described below with reference to the drawings submitted herewith.

An information processing apparatus receives a return request to return from a power saving mode during operation in a power saving mode, and shifts a power state of the information processing apparatus to a state where operation corresponding to the received return request is performable. The return requests received by the information processing apparatus can include a request that can be processed by supplying power to some of the modules that are not supplied with power in the power saving mode. This corresponds to, for example, a case in which a request to acquire the state of the information processing apparatus is detected. The return request is issued from another apparatus that is connected to the same network as the network to which the information processing apparatus is connected. In some embodiments, since the information processing apparatus does not perform scan processing and print processing, the information processing apparatus does not supply power to the printer unit, the scanner unit, and an operation unit, but supplies power to a control unit, to perform processing corresponding to the acquisition request. In a case where the power supply to some of the modules is resumed in response to the above-described return request, power is supplied to the control unit of the information processing apparatus, while control by a power factor correction (PFC) circuit is not performed since the current flowing through the information processing apparatus is small. When the power supply to the control unit is performed without use of a power factor correction (PFC) circuit after the information processing apparatus completes the processing corresponding to the above-described return request, power can be supplied to the control unit even though the control unit does not perform processing, which can cause unnecessary power consumption.

According to the present exemplary embodiment, power consumption by the information processing apparatus, after a return request is received to return the information processing apparatus from the power saving mode to a power state in which control by the PFC circuit is not performed and the processing corresponding to the return request is performed, can be controlled.

Figure 1:
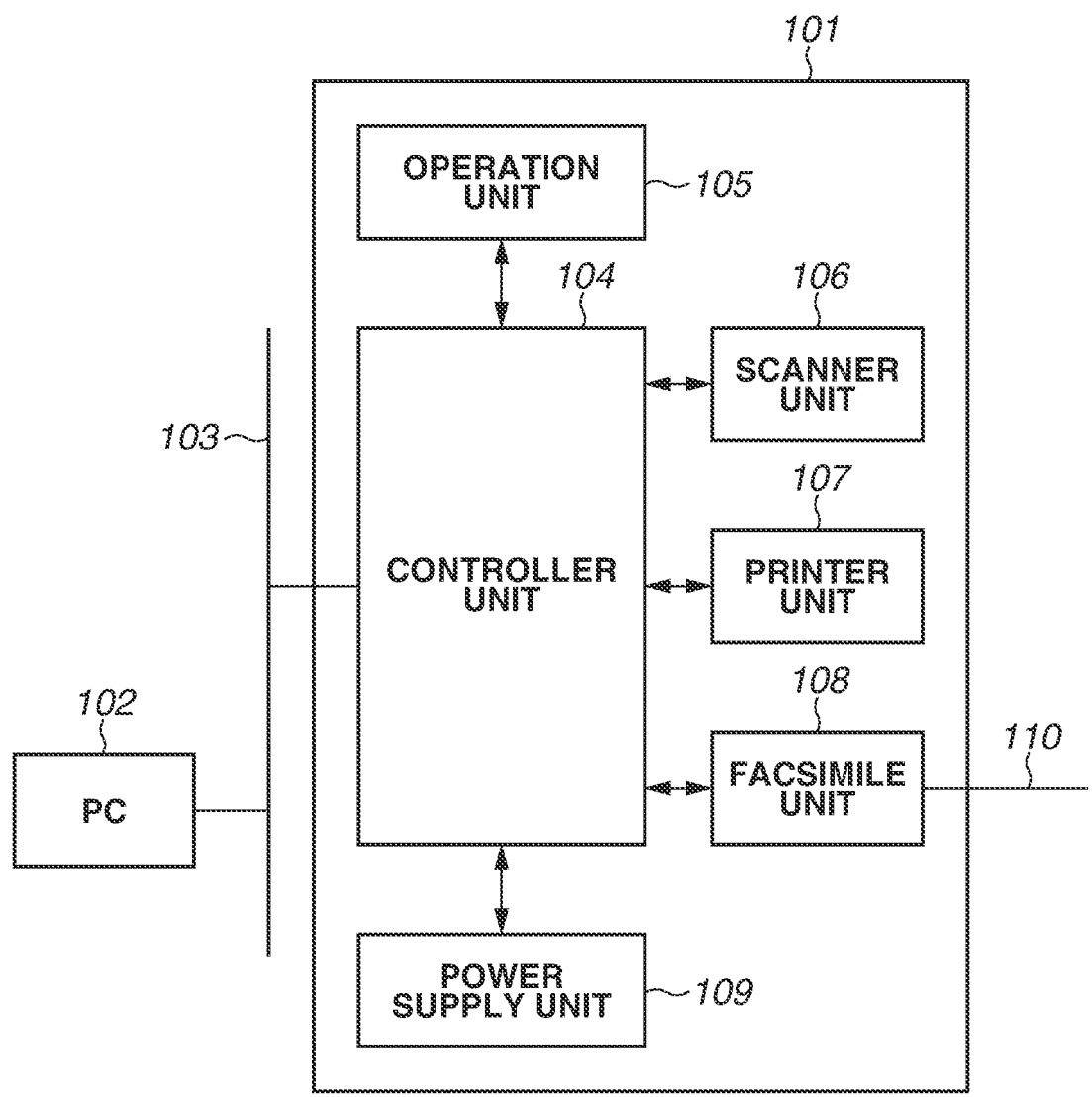
FIG. 1 is a diagram illustrating a system configuration including a multifunctional peripheral and a configuration of the multifunctional peripheral according to an exemplary embodiment.

FIG. 1 is a diagram illustrating a system configuration example including a multifunctional peripheral that is an example of the information processing apparatus according to the exemplary embodiment of the present disclosure. The multifunctional peripheral is an example of the information processing apparatus according to the present exemplary embodiment, and the information processing apparatus may be a personal computer, a single function printer (SFP) including only a part of functions of the multifunctional peripheral, or the like.

In FIG. 1, a multifunctional peripheral 101 is connected to a personal computer (PC) 102 via a network 103. The PC 102 is a computer that can perform data transmission/reception with the multifunctional peripheral 101. The multifunctional peripheral 101 includes functions of copy, printer, scanner, facsimile, etc.

Next, a schematic configuration and operation of the multifunctional peripheral 101 are described with reference to FIG. 1. An operation unit 105 includes a button and an operation panel that are used by an operator to perform various kinds of operation, and a display unit that displays information input by a user. A scanner unit 106 includes a mechanism that scans a document image, converts the scanned document image into digital data, and inputs the digital data to a controller unit 104. A printer unit 107 prints the image data processed by the controller unit 104 on a sheet, and outputs the printed sheet. A facsimile unit 108 is connected to a telephone line 110, and performs facsimile transmission of the document read by the scanner unit 106 or prints and outputs facsimile data received via the telephone line 110 by the printer unit 107. A power supply unit 109 is a power supply of the multifunctional peripheral 101, and converts alternating-current power into direct-current power and supplies the converted power to each of the units in the multifunctional peripheral 101.

Figure 2:
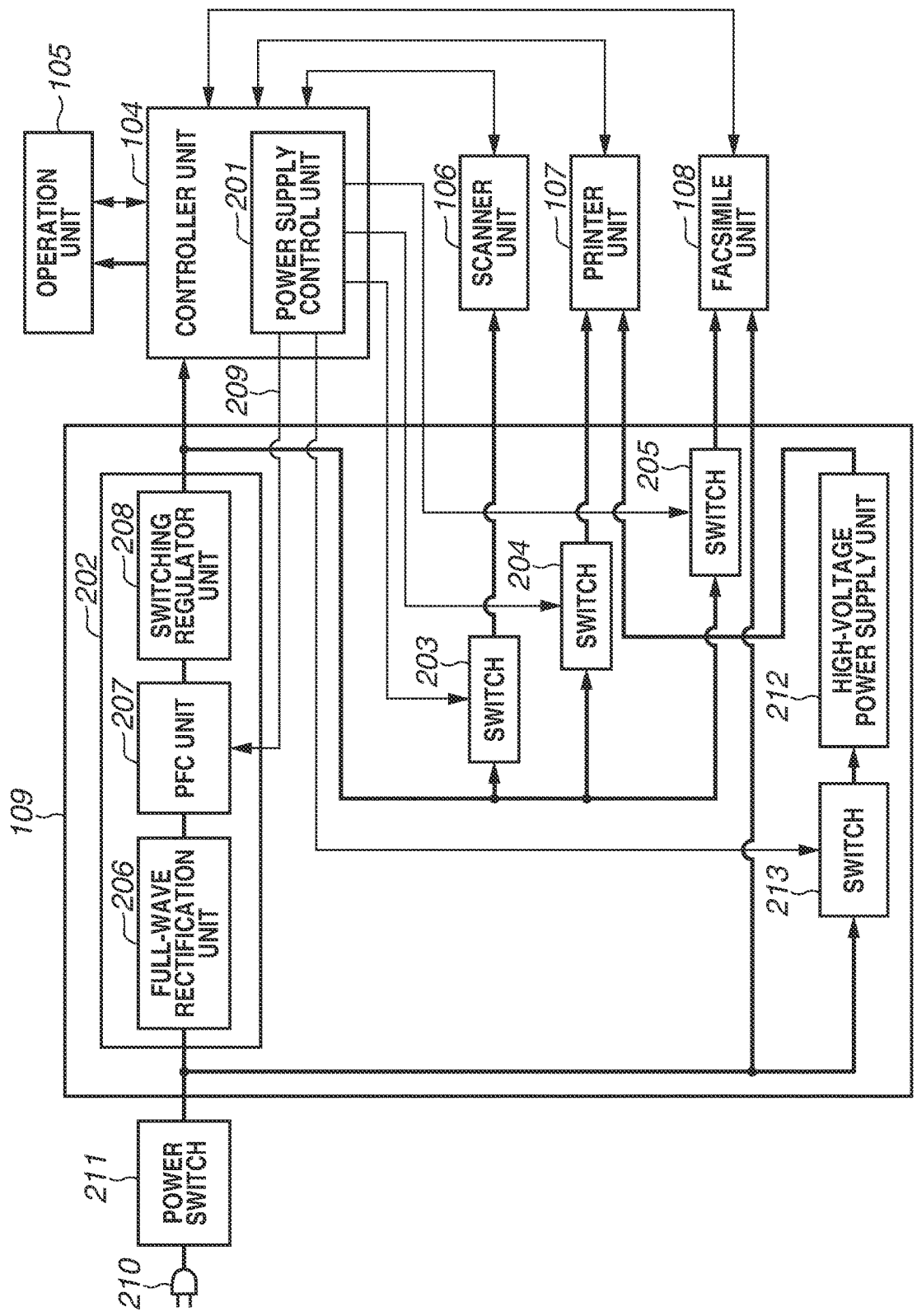
FIG. 2 is a block diagram illustrating an internal configuration of the multifunctional peripheral according to the present exemplary embodiment.

Next, an internal configuration of the multifunctional peripheral 101 is described with reference to FIG. 2.

An example of a power switch 211 is a seesaw switch that is operated by the user. In a case where the power switch 211 is turned on by the user, commercial alternating-current power is supplied to the power supply unit 109 via a power supply plug 210. The alternating-current power input to the power supply unit 109 is supplied to a power supplying unit 202 and a high-voltage power supply unit 212. The power supplying unit 202 converts the input alternating-current power into direct-current power. The high-voltage power supply unit 212 generates high-voltage power to be used for image formation when the printer unit 107 performs printing.

The direct-current power generated by the power supplying unit 202 from the alternating-current power is supplied to the controller unit 104 and the operation unit 105. Further, the direct-current power generated by the power supplying unit 202 is supplied to the scanner unit 106, the printer unit 107, and the facsimile unit 108 respectively via switches 203, 204, and 205.

The high-voltage power generated by the high-voltage power supply unit 212 is supplied to the printer unit 107.

The switches 203 to 205 and a switch 213 are turned on or off by a power supply control unit 201 of the controller unit 104. The multifunctional peripheral 101 can perform precise power control by changing the switches for the respective units. When the printer unit 107 performs the print processing, the switch 213 is turned on to supply the high-voltage power to the printer unit 107.

For example, when the mode is shifted from a job mode in which job execution is in progress to the power saving mode in which the power consumption is reduced, the switches 203, 204, 205, and 213 are turned off by the power supply control unit 201, and the power supply to the scanner unit 106 and the printer unit 107 is stopped. In the power saving mode, the facsimile unit 108 is supplied with power. This is because minimum power supply is required to a part for detecting incoming call via the telephone line 110.

The power supplying unit 202 includes a full-wave rectification unit 206 that performs full-wave rectification on the alternating-current power, a PFC unit 207 that corrects a power factor of an output of the full-wave rectification unit 206, and a switching regulator unit 208 that converts the voltage output from the PFC unit 207 into a desired voltage. The PFC circuit corrects the power factor by shaping a current waveform of the input alternating-current power to bring the current waveform close to the voltage waveform. As a result, it is possible to reduce a harmonic component of the current output from the power supply, and to prevent occurrence of noise fault.

A PFC control signal 209 is input to the PFC unit 207 from the power supply control unit 201. The power supply control unit 201 switches High and Low of the PFC control signal 209 to turn on and off the PFC operation. Operation when the PFC unit 207 is turned on and operation when the PFC unit 207 is turned off are described below with reference to FIG. 4.

When the multifunctional peripheral 101 is operated in the job mode with large power consumption, the power supply control unit 201 turns on the PFC unit 207. Meanwhile, when the multifunctional peripheral 101 is operated in the power saving mode with low power consumption, the power supply control unit 201 turns off the PFC unit 207. In the power saving mode, the harmonic component of the current flowing through the multifunctional peripheral 101 is reduced in proportion to reduction of the amount of the flowing current. Therefore, the multifunctional peripheral 101 sets the PFC unit 207 to the off state in which the PFC unit 207 is not controlled. This makes it possible to reduce a ratio of the power consumption by the PFC unit 207 to the power consumption by the multifunctional peripheral 101.

Figure 3:
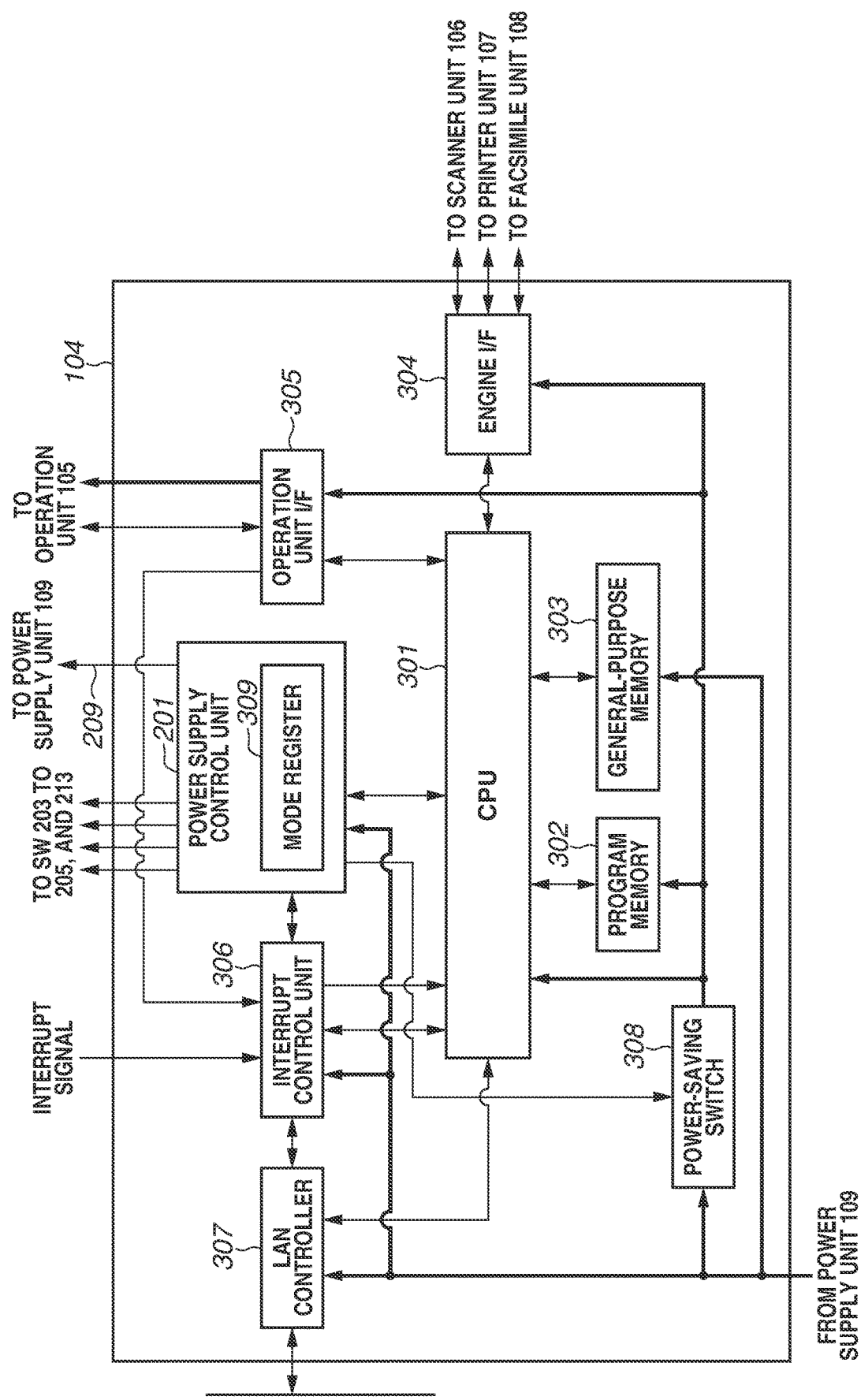
FIG. 3 is a block diagram illustrating a configuration of a controller unit in the multifunctional peripheral according to the present exemplary embodiment.

FIG. 3 is a block diagram illustrating a configuration of the controller unit 104.

The controller unit 104 includes a central processing unit (CPU) 301, a program memory 302, a general-purpose memory 303, an engine interface (I/F) 304, an operation unit I/F 305, an interrupt control unit 306, a local area network (LAN) controller 307, the power supply control unit 201, and a power saving switch 308.

The CPU 301 is connected to the engine I/F 304 and the LAN controller 307 via a peripheral component interconnect (PCI) Express bus.

The controller unit 104 includes interface circuits for various kinds of peripheral devices, such as the scanner unit 106 and the printer unit 107. The CPU 301 executes a program stored in the program memory 302, and controls the scanner unit 106 and the printer unit 107 via the interface circuits.

The program memory 302 stores a program to control the multifunctional peripheral 101, and control data. The CPU 301 develops the program stored in the program memory 302, to the general-purpose memory 303, and executes the developed program to control the multifunctional peripheral 101.

The general-purpose memory 303 is used as a work memory of the CPU 301, and stores image data, etc. corresponding to a target unit based on various kinds of processing modes such as copy, scan, print, and facsimile.

The engine I/F 304 is connected to the scanner unit 106, the printer unit 107, and the facsimile unit 108, and performs communication control and transmission/reception of image data.

The operation unit I/F 305 is an interface for connection to the operation unit 105. The operation unit I/F 305 performs communication of operation information about the key, the touch panel, etc. of the operation unit 105, and transmits screen data to be displayed on the operation unit 105.

The interrupt control unit 306 detects an interrupt signal from each of the units in the apparatus, and performs notification to the power supply control unit 201 and the CPU 301 based on the interrupt signal. The interrupt signal is, for example, a signal input from the operation unit 105 via the operation unit I/F 305, and a signal from an external apparatus connected to the network 103 via the LAN controller 307. In response that the power supply control unit 201 receives notification from the interrupt control unit 306, the switch to supply power to a part that performs processing corresponding to the notification is turned on. As a result, the multifunctional peripheral 101 shifts from the power saving mode to a different power mode. The interrupt control unit 306 can perform determination of a return request, based on that the interrupt signal has been received via which signal line. The power supply control unit 201 turns on a switch corresponding to the type of the return request.

The LAN controller 307 is a network control unit that is connected to the network 103 and performs transmission/reception of data with the external apparatus such as the PC 102. The CPU 301 receives print data and a packet requesting acquisition of the state of the multifunctional peripheral 101, from the external apparatus such as the PC 102 via the LAN controller 307. The LAN controller 307 is supplied with power even in the power saving mode. The LAN controller 307 can receive a network packet from outside when the multifunctional peripheral 101 is operated in the power saving mode, and asserts a trigger signal to the interrupt control unit 306 when receiving the network packet.

The power saving switch 308 changes whether to supply the power supplied from the power supply unit 109, to each of the units. The power saving switch 308 is turned off by the power supply control unit 201 when the multifunctional peripheral 101 shifts to the power saving mode. When the power saving switch 308 is turned off, power supply to the CPU 301, the program memory 302, the engine I/F 304, the operation unit I/F 305, and the operation unit 105 is stopped.

Meanwhile, even in the power saving mode, the power is supplied to the power supply control unit 201, the interrupt control unit 306, the LAN controller 307, and the general-purpose memory 303.

The CPU 301 saves the holding data in the general-purpose memory 303 before the multifunctional peripheral 101 shifts to the power saving mode. Further, the CPU 301 shifts the general-purpose memory 303 to a self-refresh mode in which reading/writing of the general-purpose memory 303 by the CPU 301 is not performable but the general-purpose memory 303 can hold data.

When the multifunctional peripheral 101 is operated in a mode other than the power saving mode, the CPU 301 monitors a transition trigger to the power saving mode or a standby mode. Examples of the transition trigger to the standby mode include lapse of a predetermined time after last operation by the user, lapse of a predetermined time after completion of a last executed job, and operation of a transition button to the power saving mode by the user. The CPU 301 detects the transition trigger to the standby mode, and sets a mode register 309 to the standby mode. Further, the CPU 301 instructs transition to the standby mode, to the power supply control unit 201. The power supply control unit 201 turns off the power saving switch 308, and shifts to the standby mode. Examples of the transition trigger to the power saving mode include lapse of a predetermined time after transition to the standby mode. The CPU 301 detects the transition trigger to the power saving mode. The CPU 301 sets the mode register 309 of the power supply control unit 201 to the power saving mode based on the transition trigger to the power saving mode. Further, the CPU 301 instructs the power supply control unit 201 to start transition processing to the power saving mode.

Figure 4:
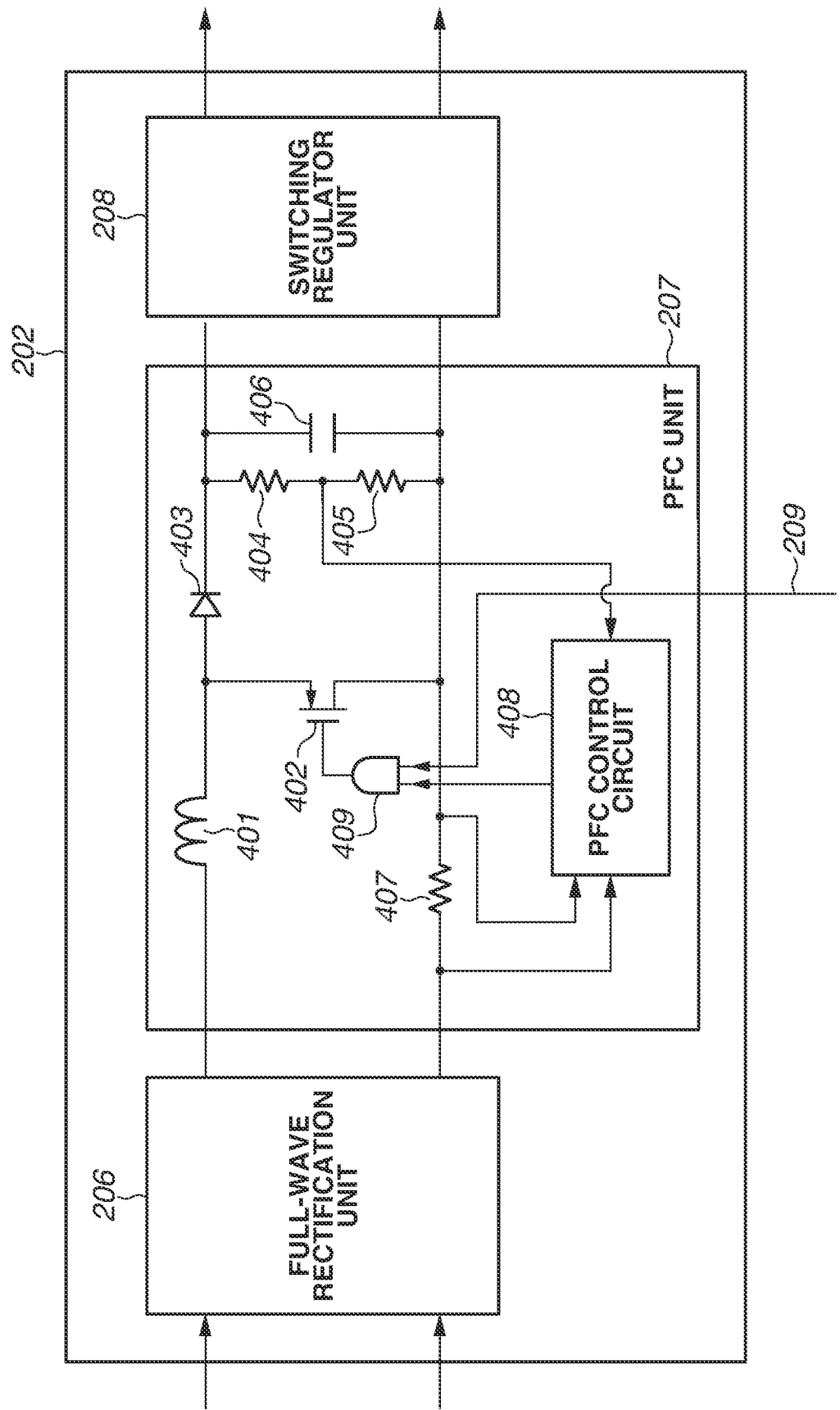
FIG. 4 is a block diagram illustrating an internal configuration of a power supplying unit according to the present exemplary embodiment.

FIG. 4 is a block diagram illustrating an internal configuration of the power supplying unit 202. In particular, a configuration of the PFC unit 207 is described in detail.

The full-wave rectification unit 206 rectifies the alternating-current voltage input from the power supply plug 210, and outputs a pulsating voltage. The voltage output from the full-wave rectification unit 206 is input to the PFC unit 207.

The PFC unit 207 includes a PFC control circuit 408, and the PFC control circuit 408 turns on and off a field-effect transistor (FET) 402 in such a manner that the current waveform is synchronized with the voltage waveform.

The PFC unit 207 turns on the FET 402 to store power in a choke coil 401, and turns off the FET 402 to supply the power stored in the choke coil 401 to a primary smoothing capacitor 406 through a diode 403, to regulate the current waveform. The PFC control circuit 408 monitors values of the voltages divided by voltage-dividing resistors 404 and 405 and a value of a current flowing through a resistor 407, and controls the FET 402.

The PFC control signal 209 is controlled by the power supply control unit 201, and turns on and off the PFC unit 207. When the PFC unit 207 is turned on, the FET 402 is turned on and off based on an output of the PFC control circuit 408. When the PFC unit 207 is turned on, the power supply control unit 201 sets the PFC control signal 209 to High. The PFC control signal 209 and the output of the PFC control circuit 408 are input to an AND circuit 409. Further, an output of the AND circuit 409 is applied to a gate terminal of the FET 402, and the FET 402 is accordingly turned on and off. When the PFC unit 207 is turned off, the FET 402 is turned off irrespective of the output of the PFC control circuit 408. When the PFC unit 207 is turned off, the power supply control unit 201 sets the PFC control signal 209 to Low. As a result, the FET 402 is off irrespective of the output of the PFC control circuit 408. When the FET 402 is off, the power is supplied to the primary smoothing capacitor 406 through the diode 403.

When the multifunctional peripheral 101 is operated in the power saving mode or the standby mode described below, power loss in the FET 402 can be reduced by turning off the PFC unit 207 to not turn on and off the FET 402.

Figure 5:
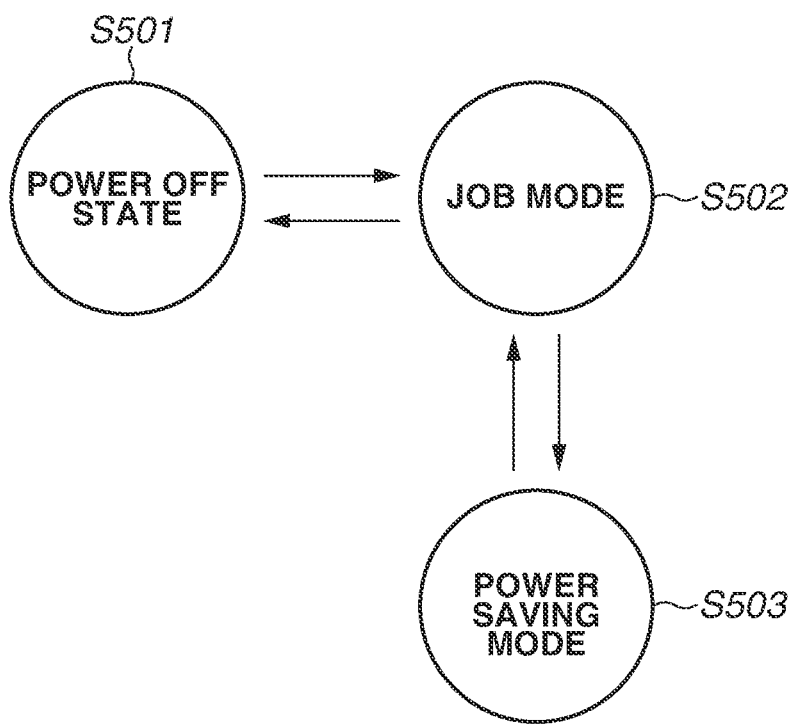
FIG. 5 is a diagram illustrating state transition of power modes of a multifunctional peripheral according to an existing technology.

State transition of power modes in an existing multifunctional peripheral is described with reference to FIG. 5 and Table 1. FIG. 5 is a diagram illustrating the power modes included in the existing multifunctional peripherals and relationship of the power modes. Table 1 illustrates on/off of the switches in each of the power modes.

TABLE 1

Power modes and states of switches and PFC in existing multifunctional peripherals

| | Power off state | Power saving mode | Job mode |
|---|---|---|---|
| Power switch 211 | OFF | ON | ON |
| Power saving switch 308 | OFF | OFF | ON |
| Switch 203, 204, 205, 213 | OFF | OFF | ON |
| PFC operation | OFF | OFF | ON |

The existing multifunctional peripherals include a power-off state S501, a job mode S502, and a power saving mode S503 as the power modes.

In the power-off state S501, the power switch 211 of the multifunctional peripheral 101 is turned off, power is not supplied to the power supply unit 109, and power supply to each of the units is interrupted. In the power-off state S501, since the power switch 211 is turned off, the switches 203, 204, 205, and 213 are all off, and the PFC circuit is not operated and is therefore off.

When the power switch 211 is turned on in the power-off state S501, the multifunctional peripheral 101 shifts to the job mode S502. In the job mode S502, power is supplied to the inside of the multifunctional peripheral 101, and various kinds of jobs such as copy, print, and facsimile are executed or executable. The transition of the power state of the system in the job mode S502 is achieved when the CPU 301 controls the power supply control unit 201 according to the program in the program memory 302. The job mode S502 consumes the largest power among the above-described three modes S501 to S503. In the job mode S502, the power switch 211 the power saving switch 308, and the switches 203 to 205 and 213 are turned on, and the PFC circuit is set to on for operation.

In the power saving mode S503, the switches 203, 204, 205, and 213 of the power supply unit 109 and the power saving switch 308 of the controller unit 104 are turned off, and power is supplied to a part of the controller unit 104. More specifically, power is supplied to the general-purpose memory 303, the power supply control unit 201, the interrupt control unit 306, the LAN controller 307, and a part of the facsimile unit 108 in FIG. 3. Further, the general-purpose memory 303 is shifted to the self-refresh mode for reduction in the power consumption. Even when the operation unit I/F 305 is not supplied with power, the interrupt control unit 306 can detect pressing of the power saving switch 308 of the operation unit 105.

The PFC operation is set to on in the job mode S502, and the PFC operation is set to off in the power-off state S501 and the power saving mode S503. In the power saving mode S503, a packet inquiring about the state of the multifunctional peripheral 101 is received via the network in some cases. When the multifunctional peripheral 101 handles the packet inquiring about the state, the multifunctional peripheral 101 does not use the scanner unit 106, the printer unit 107, and the facsimile unit 108. Therefore, the multifunctional peripheral 101 according to the present exemplary embodiment can shift to the standby mode in which power is supplied to the controller unit 104 but is not supplied to the scanner unit 106 and the printer unit 107, in addition to the power-off state S501, the job mode S502, the power saving mode S503. In the standby mode, the number of units supplied with power is small and the amount of the current flowing through the multifunctional peripheral 101 is small, as compared with the job mode. Therefore, even when the PFC unit 207 is not started up, the harmonic component of the current is small. The multifunctional peripheral 101 according to the present exemplary embodiment turns off the FET 402 in the standby mode to not perform control by the PFC unit 207. With this configuration, the ratio of the power consumption by the PFC unit 207 to the power consumption by the whole of the multifunctional peripheral 101 can be reduced.

Figure 6:
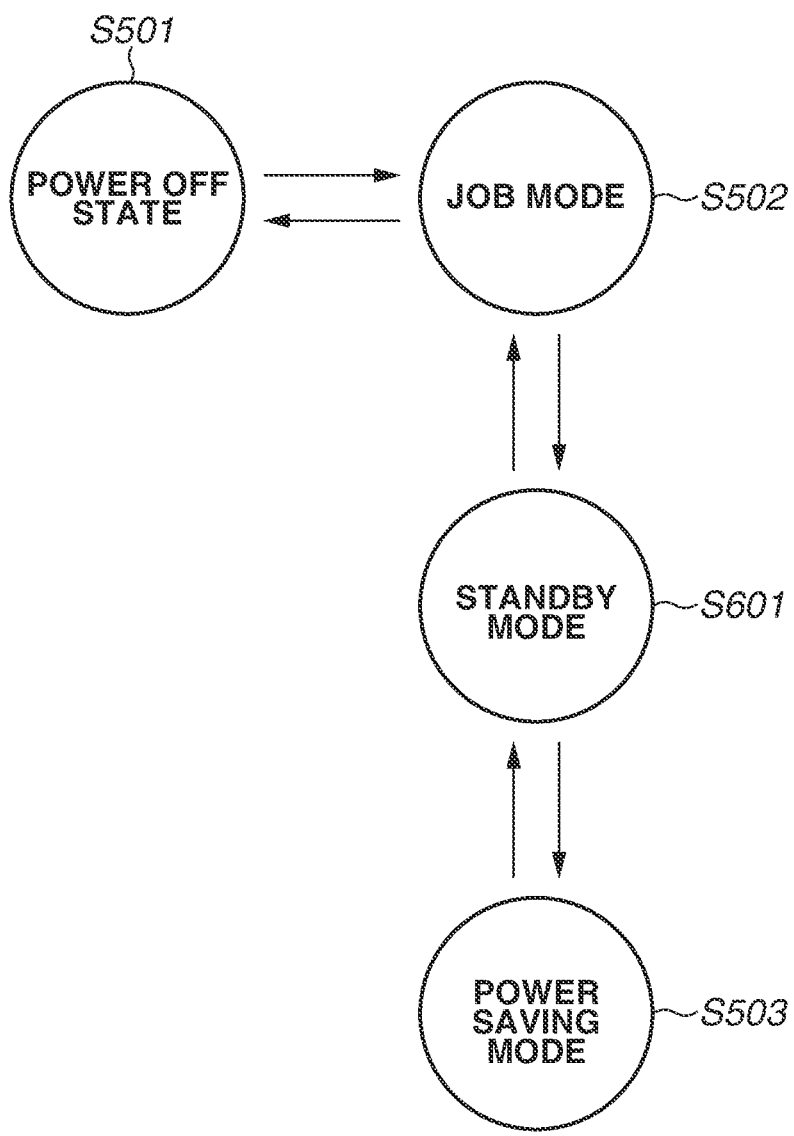
FIG. 6 is a diagram illustrating state transition of power modes of the multifunctional peripheral according to the present exemplary embodiment.

The state transition of the power modes according to the present exemplary embodiment is described with reference to FIG. 6 and Table 2. FIG. 6 is a diagram illustrating the plurality of power modes included in the multifunctional peripheral 101 according to the present exemplary embodiment, and relationship of the plurality of power modes. Table 2 illustrates on/off of the switches in each of the plurality of power modes included in the multifunctional peripheral 101 according to the present exemplary embodiment.

TABLE 2

Power modes and states of switches and PFC according to present exemplary embodiment

| | Power off state | Power saving mode | Standby mode | Job mode |
|---|---|---|---|---|
| Power switch 211 | OFF | ON | ON | ON |
| Power saving switch 308 | OFF | OFF | ON | ON |
| Switch 203, 204, 205, 213 | OFF | OFF | OFF | ON |
| PFC operation | OFF | OFF | OFF | ON |

According to the present exemplary embodiment, the power-off state, the job mode, the standby mode, and the power saving mode are provided. A standby mode S601 is added to the modes of the existing technology. In the standby mode S601, the power saving switch 308 is turned on and power is supplied to the CPU 301, etc., but the PFC operation is set to off. The multifunctional peripheral 101 starts transition processing from the job mode to the standby mode based on that the multifunctional peripheral 101 satisfies a predetermined condition in the job mode. Examples of the predetermined condition include lapse of a predetermined time after completion of a job, lapse of a predetermined time after last operation by the user, and transition instruction to the power saving mode by the user.

The power consumption is high in order of the job mode, the standby mode, the power saving mode, and the power-off state.

When return request is detected in the power saving mode S503, the mode is shifted to the standby mode S601 and the CPU 301 is started up, and the return request is then fixed by the CPU 301. Table 3 illustrates relationship between types of a return trigger that inputs an interrupt signal to the interrupt control unit 306 and the power saving modes to which the multifunctional peripheral 101 shifts in response to the interrupt signal caused by the return trigger, when the multifunctional peripheral 101 is operated in the power saving mode S503.

TABLE 3

Trigger causing return from power saving mode, and power mode of transition destination

| Return trigger | Description of return trigger | Power mode of transition destination |
|---|---|---|
| Pressing of operation unit switch | Power saving switch of operation unit is pressed | Job mode |
| Reception of network print job | Print job is received from external PC, etc. via network | Job mode |
| Setting of clock | Time becomes time set by user, or time set by user has elapsed after transition to power saving mode | Job mode |
| Reception of facsimile | Facsimile unit receives incoming call through telephone line | Job mode |
| Reception of network information request packet | Packet to request information is received from external PC, etc. via network | Standby mode |

The trigger "pressing of operation unit switch" is a return trigger based on that the user presses the power saving switch of the operation unit when the multifunctional peripheral 101 is operated in the power saving mode. The trigger "reception of network print job" is a return trigger based on reception of a print job from the PC 102 through the network 103. The trigger "setting of clock" is a return trigger based on that the current time becomes the time set by the user, or the time set by the user has elapsed after the mode is shifted to the power saving mode S503. The trigger "reception of facsimile" is a return trigger output based on that the facsimile unit 108 receives facsimile via the telephone line 110. The trigger "reception of network information request packet" is a return trigger based on reception of a packet requesting acquisition of the state of the multifunctional peripheral 101 via the network 103.

The multifunctional peripheral 101 shifts from the job mode S502 to the standby mode S601 after the job such as copy, scan, print, and facsimile is completed, or based on that a predetermined time has elapsed after the last operation on the operation unit 105. In this process, the elapsed time until when the multifunctional peripheral 101 shifts from the job mode S502 to the standby mode S601 is a time set by the user, for example, 30 minutes or one hour.

The multifunctional peripheral 101 shifts from the standby mode S601 to the power saving mode S503 based on that an idling state in which the network communication is not performed is continued for a predetermined time after transition to the standby mode. The elapsed time until when the multifunctional peripheral 101 shifts from the standby mode S601 to the power saving mode S503 is, for example, 15 seconds.

In FIG. 6, in the case where the transition condition is satisfied in the job mode, the multifunctional peripheral 101 shifts to the power saving mode via the standby mode. The multifunctional peripheral 101 may shift to the power saving mode not via the standby mode, based on satisfaction of the transition condition in the job mode.

FIG. 7 is a flowchart illustrating the processing executed by the CPU 301 in the present exemplary embodiment. The program for execution of the processing illustrated in the flowchart is stored in the program memory 302, and the CPU 301 develops the program in the general-purpose memory 303 and executes the processing.

After the power supply is turned on, the CPU 301 energizes all of the units in the apparatus, and writes "job mode" as the operation mode in the mode register 309 in step S701. In step S701, the CPU 301 controls the power supply control unit 201, and sets the PFC control signal 209 to High. When the PFC control signal 209 is set to High, the PFC unit 207 is turned on, and the PFC control becomes executable. The CPU 301 controls the power supply control unit 201, and sets the switches 203, 204, 205, and 213 and the power saving switch 308 to on to energize the units.

Next, in step S702, the CPU 301 performs initialization processing of the scanner unit 106, the printer unit 107, and the facsimile unit 108. After the processing in step S702 is completed, the multifunctional peripheral 101 can operate the scanner unit 106, the printer unit 107, and the facsimile unit 108.

In step S701, the CPU 301 determines whether shutdown has been instructed. The shutdown is instructed, for example, when the user turns off the power switch of the multifunctional peripheral 101, when remote shutdown is instructed from an information processing apparatus such as a PC connected to the network, or the time becomes a time preset by the user. In a case where shutdown has been instructed (YES in step S703), the CPU 301 performs shutdown processing in step S704, and the processing ends.

In a case where shutdown has not been instructed in step S703 (NO in step S703), the CPU 301 determines in step S705 whether a transition trigger to the standby mode has been generated. Examples of the transition trigger to the standby mode include lapse of a predetermined time after completion of job execution or after last operation by the user, and pressing of the power saving button by the user. The interrupt signal is input to the interrupt control unit 306 based on generation of the above-described transition trigger. The interrupt control unit 306 notifies the CPU 301 of input of the interrupt signal. The CPU 301 determines that the transition trigger to the standby mode has been generated, based on notification of the input of the interrupt signal from the interrupt control unit 306.

In a case where the transition trigger to the standby mode has not been generated (NO in step S705), the processing returns to step S703. In a case where the transition trigger to the standby mode has been generated (YES in step S705), the CPU performs transition processing to the standby mode in step S706. The transition processing to the standby mode is processing to stop power supply to the scanner unit 106, the printer unit 107, and the facsimile unit 108 that are not supplied with the power in the standby mode. The processing to stop power supply is processing in which the CPU 301 saves log data saved in the printer unit 107, in the general-purpose memory 303 of the controller unit 104.

In step S707, the CPU 301 notifies the power supply control unit 201 of transition to the standby mode. In step S707, the power supply control unit 201 receiving notification from the CPU 301 sets the switches 203, 204, 205, and 213 to off. Further, the CPU 301 sets the PFC control signal 209 to Low, and sets the PFC unit 207 to off.

In step S708, the CPU 301 determines whether a transition trigger to the job mode has been generated in the standby mode. In step S708, the transition trigger is any of the transition triggers illustrated in Table 3 except for reception of network information request packet. The interrupt control unit 306 detects the interrupt signal, and notifies the CPU 301 of generation of the interrupt signal and information indicating that which interrupt signal has been generated. The CPU 301 determines whether the interrupt signal is the transition trigger to the job mode, based on the notified information. For example, in a case where a packet is received via the network, the interrupt signal is input to the interrupt control unit 306 in response to the reception of the packet. The interrupt control unit 306 notifies the CPU 301 of a signal indicating reception of the interrupt signal and information indicating whether the packet is a packet addressed to a predetermined port number, based on the input interrupt signal. The predetermined port number is, for example, 9100. In transmission control protocol/internet protocol (TCP/IP) protocol, the port 9100 is used for input of a print job. Accordingly, in a case where the received packet is addressed to the port 9100, the interrupt control unit 306 notifies the CPU 301 of a signal indicating that the received packet is addressed to the port 9100. The CPU 301 determines that the generated interrupt signal is the transition trigger to the job mode, based on the notification. According to the present exemplary embodiment, the CPU 301 determines whether the generated interrupt signal is the transition trigger. Alternatively, the power supply control unit 201 may determine whether the generated interrupt signal is the transition trigger.

In a case where it is determined in step S708 that the transition trigger has been generated (YES in step S708), the processing returns to step S701.

In a case where it is determined in step S708 that the transition trigger to the job mode has not been generated (NO in step S708), the CPU 301 determines whether the transition trigger to the power saving mode has been generated in step S709. In step S709, the transition trigger is a trigger issued based on lapse of a predetermined time after the multifunctional peripheral 101 shifts to the standby mode or after response to the last information request packet.

In a case where the transition trigger to the power saving mode has not been generated (NO in step S709), the processing returns to step S708. In a case where it is determined in step S709 that the transition trigger to the power saving mode has been generated (YES in step S709), the CPU 301 performs transition processing to the power saving mode in step S710. The CPU 301 sets the operation setting of the LAN controller 307 to the power saving mode, and shifts the general-purpose memory 303 to the self-refresh mode.

In step S711, the CPU 301 notifies the power supply control unit 201 of transition to the power saving mode. In step S711, the power supply control unit 201 turns off the power saving switch 308. The transition processing to the power saving mode is thus completed.

Figure 8A:
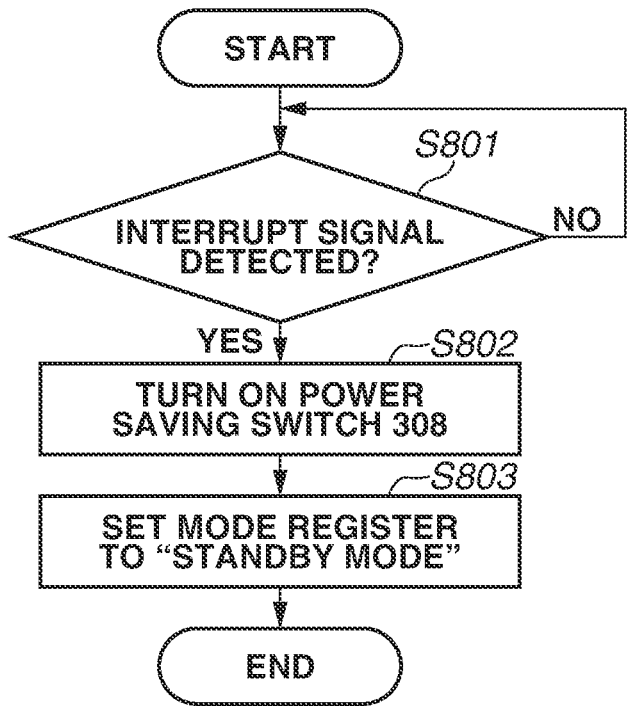
FIGS. 8A and 8B are flowcharts illustrating processing relating to return from a power saving mode of the multifunctional peripheral according to the present exemplary embodiment.

Next, processing by the power supply control unit 201 when the mode is returned from the power saving mode to the standby mode is described. FIG. 8A is a flowchart illustrating processing executed when the interrupt control unit 306 detects the interrupt signal in the power saving mode. According to the present exemplary embodiment, the processing illustrated in FIG. 8A is executed using a logic circuit.

In step S801, the power supply control unit 201 determines whether the interrupt signal has been input to the interrupt control unit 306. In a case where the interrupt signal has not been input (NO in step S801), the processing in step S801 is continued. In a case where the interrupt signal has been input (YES in step S801), the power supply control unit 201 turns on the power saving switch 308 in step S802. When the power supply control unit 201 turns on the power saving switch 308, power is supplied to the CPU 301, the program memory 302, the operation unit I/F 305, and the engine I/F 304. Further, in step S803, the power supply control unit 201 sets the value of the mode register 309 to "standby mode". The power supply to the CPU 301 is resumed by the processing illustrated in FIG. 8A, and the multifunctional peripheral 101 returns from the power saving mode to the standby mode.

Figure 8B:
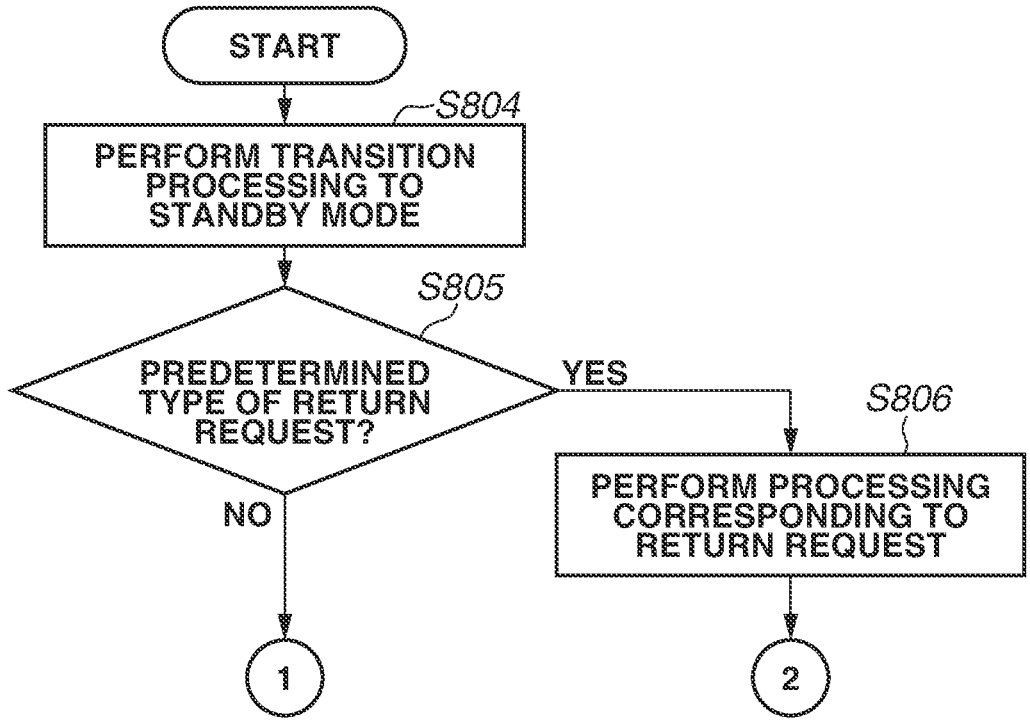

Processing illustrated in FIG. 8B is processing executed by the CPU 301 after the power supply control unit 201 completes the processing illustrated in FIG. 8A. The program for execution of the processing illustrated in the flowchart is stored in the program memory 302, and the CPU 301 develops the program in the general-purpose memory 303 and executes the processing.

In step S804, the CPU 301 starts transition processing to the standby mode based on start of the power supply. The CPU 301 shifts the general-purpose memory 303 from the self-refresh mode to the operation mode, and initializes the LAN controller 307.

In step S805, the CPU 301 determines whether the interrupt signal input to the interrupt control unit 306 has been generated by which return request, and determines whether the return request is of a predetermined type. The predetermined type of the return request is return request by the packet for acquiring the state of the multifunctional peripheral 101, among packets input to the interrupt control unit 306 from an external apparatus via the LAN controller 307.

In a case where the return request is not of the predetermined type (NO in step S805), the processing proceeds to step S701 in FIG. 7, the CPU 301 sets the PFC control signal 209 to High, and shifts the multifunctional peripheral 101 to the job mode. Meanwhile, in a case where the return request is of the predetermined type (YES in step S805), the CPU 301 executes processing corresponding to the return request without setting the PFC control signal 209 to High in step S806. The processing corresponding to the return request is processing such as transmission of the state of the multifunctional peripheral 101 to an external apparatus. After the CPU 301 completes the processing corresponding to the return request, the processing proceeds to step S708 in FIG. 7. According to the present exemplary embodiment, the CPU 301 executes the processing illustrated in FIG. 8B. Alternatively, the power supply control unit 201 may determine whether the return request is of the predetermined type, and may shift the multifunctional peripheral 101 to the job mode in a case where the return request is not of the predetermined type. After transition to the job mode or the standby mode, the multifunctional peripheral 101 executes the processing corresponding to the return request. For example, in a case where the mode is shifted from the power saving mode to the standby mode in response to reception of the packet inquiring about the state of the multifunctional peripheral 101 from the external apparatus, the packet notifying the state of the multifunctional peripheral 101 is transmitted to the external apparatus. In a case where the mode is shifted from the power saving mode to the job mode in response to reception of a print job, the multifunctional peripheral 101 executes the received print job.

When the mode is returned from the power saving mode to the standby mode as described above, the PFC control signal 209 is still set to Low. With this configuration, power consumption by the PFC unit 207 can be reduced when the mode is returned from the power saving mode to the standby mode. Further, after the mode is returned from the power saving mode to the standby mode and the processing corresponding to the return request is performed in the standby mode, the multifunctional peripheral 101 shifts to the power saving mode. With this configuration, the multifunctional peripheral 101 is prevented from remaining in the standby mode after the multifunctional peripheral 101 shifts to the standby mode and performs the processing corresponding to the return request, whereby power consumption by the CPU 301 can be reduced.

As described above, according to the present exemplary embodiment, the standby mode in which the power consumption is lower than the power consumption in the job mode and the response processing to the information request packet is performable while the PFC operation is off is provided. Since the PFC operation is always off in transition from the power saving mode to the standby mode and transition from the standby mode to the power saving mode, it is possible to reduce power consumption.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-185427, filed Sep. 28, 2018, which is hereby incorporated by reference herein in its entirety.

What is claimed is:

1. An information processing apparatus comprising:
a power factor correction circuit configured to correct a power factor and including a switch and a control circuit which outputs a control signal to turn on the switch;
a regulator configured to input power corrected by the power factor correction circuit and perform control so that a predetermined voltage is output; and
a power controller configured to shift a power state of the information processing apparatus from a first power state in which the power factor correction circuit corrects the power factor to a second power state in which the power factor correction circuit does not correct the power factor, power consumption in the second power state being lower than power consumption in the first power state;
wherein the power controller is configured to shift, based on a predetermined return request, the information processing apparatus from the second power state to a third power state and output a stop signal to stop the control signal output from the control circuit,
wherein the power controller shifts the power state of the information processing apparatus from the third power state to the second power state after processing corresponding to the predetermined return request is completed in the third power state.

2. The information processing apparatus according to claim 1, further comprising:
a setting unit configured to set whether the power factor correction circuit corrects the power factor,
wherein the setting unit performs setting to cause the power factor correction circuit to correct the power factor, based not on the predetermined return request detected in the second power state but based on a return request different from the predetermined return request detected in the second power state.

3. The information processing apparatus according to claim 1, further comprising:
a communication unit configured to communicate with an external apparatus,
wherein the predetermined return request is received via the communication unit, and is a notification inquiring about a state of the information processing apparatus.

4. The information processing apparatus according to claim 3, wherein the predetermined return request is receipt of a packet that is received via the communication unit and is addressed to a port number different from a predetermined port number.

5. The information processing apparatus according to claim 4, further comprising:
an image formation unit configured to form an image on a sheet,
wherein the power controller does not supply power to the image formation unit in the second power state, and does not supply power to the image formation unit even when the predetermined return request is detected.

6. The information processing apparatus according to claim 5, wherein another return request different from the predetermined return request is reception of a packet that is received via the communication unit and is addressed to the predetermined port number.

7. The information processing apparatus according to claim 6, wherein the predetermined port number is a port number instructing execution of image formation by the image formation unit.

8. The information processing apparatus according to claim 6,
wherein the communication unit performs communication in conformity to transmission control protocol/internet protocol (TCP/IP) protocol, and
wherein the predetermined port number is 9100.

9. The information processing apparatus according to claim 1, further comprising:
a display unit configured to display a screen, wherein the power controller does not supply power to the display unit in the second power state, and does not supply power to the display unit if the predetermined return request is detected.

10. The information processing apparatus according to claim 1, further comprising:
a reception unit configured to receive another return request that corresponds to operation of the information processing apparatus by the user, and is different from the predetermined return request, and
wherein the power controller shifts a power state of the information processing apparatus from the second power state to a different power state based on receipt of the user operation by the reception unit.

11. The information processing apparatus according to claim 1,
wherein the power factor correction circuit corrects the power factor by switching the switch to on or off.

12. The information processing apparatus according to claim 1, wherein the third power state is higher in power consumption than the second power state, and is lower in power consumption than the first power state.

13. The information processing apparatus according to claim 1, further comprising:
a processor configured to execute processing corresponding to the predetermined return request,
wherein the power controller starts power supply to the processor based on the predetermined return request.

14. The information processing apparatus according to claim 13, wherein a type of the return request is determined after the power controller starts power supply to the processor.

15. The information processing apparatus according to claim 13, wherein the power controller stops power supply to the processor and shifts to the second power state, based on a predetermined time elapsing in a state where the power factor correction circuit is set not to correct the power factor after the processing corresponding to the return request is performed.

16. The information processing apparatus according to claim 1, wherein the information processing apparatus does not perform the processing corresponding to the predetermined return request in the second power state.

17. A method of controlling an information processing apparatus, the information processing apparatus including
a converter configured to output a direct current after converting an alternating current into the direct current and
a power factor correction circuit configured to correct a power factor of the converter,
wherein the information processing apparatus is operable in a first power state in which the power factor correction circuit corrects the power factor of the converter and a second power state in which the power factor correction circuit does not correct the power factor of the output unit, power consumption in the second power state being lower than power consumption in the first power state, the method comprising:
detecting a predetermined return request in the second power state;
shifting, based on detection of the predetermined return request, the information processing apparatus to a third power state in which the power factor correction circuit does not correct the power factor of the output unit and processing corresponding to the predetermined return request is performable;
performing the processing corresponding to the detected predetermined return request in the third power state; and
shifting the information processing apparatus from the third power state to the second power state after the processing is completed.

* * * * *